March 17, 1959
L. STABRYLA
2,877,591
FISH LINE JERKING DEVICES
Filed Feb. 25, 1957
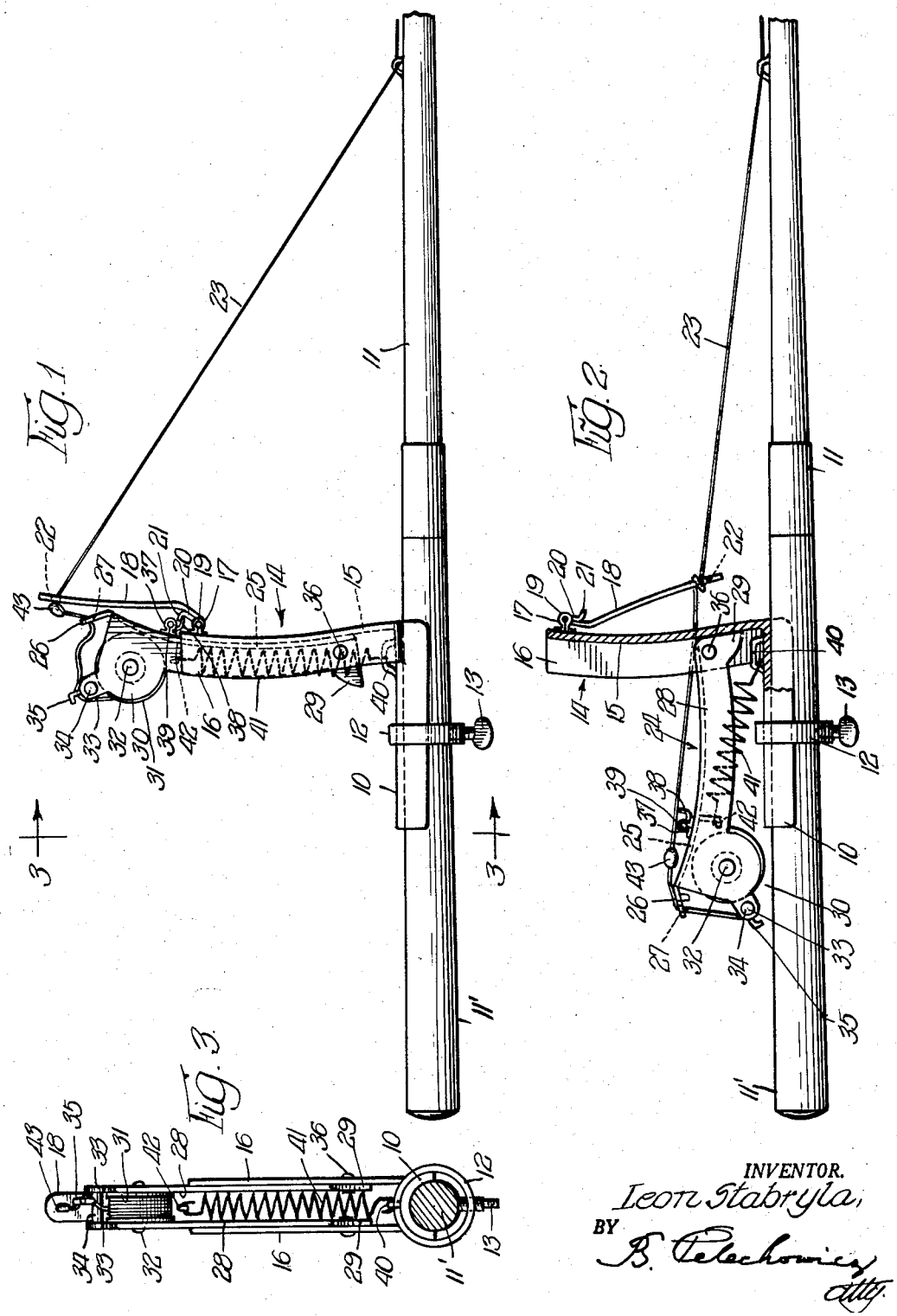
INVENTOR.
Leon Stabryla,
BY

United States Patent Office 2,877,591
Patented Mar. 17, 1959

2,877,591

FISH LINE JERKING DEVICES

Leon Stabryla, Chicago, Ill.

Application February 25, 1957, Serial No. 641,886

5 Claims. (Cl. 43—15)

The present invention relates to fish line jerking devices, and has for its main object the provision of a device whereby a fish line may be automatically jerked in order to hook a fish nibbling at the bait. By virtue of a pull exerted upon the fish line due to a fish having taken the hook the present device is instantly set in operation to bring about a sudden jerk to the line in order to assure hooking of the fish.

Another object of the present invention is the provision of the device of the type hereinabove indicated which may be easily set in a cocked position thereby conditioning the same to exert a jerking action upon the fish line instantly upon a pull having been exerted thereon by the fish taking a bait.

A still further object of the present invention is the provision of a fish line jerking device of the character indicated which may be readily attachable to a fishing rod or pole.

A still further object of the present invention is the provision of a device of the character indicated which may have comparatively few parts and which may readily be set in an operative cocked position.

Another object of the present invention is the provision in a device of the character indicated of a stationary member and a shiftable member, with means for engaging the two members when said shiftable member remains in a set cocked position, with means for disengaging said latter means for permitting said shiftable member to assume a sudden, retracted position and thereby to impart a jerk to a fish line.

With the above general objects in view and others that will appear as the invention is better understood, the same consists in the novel construction, combination and arrangement of parts hereinafter more fully described, illustrated in the accompanying drawing and pointed out in the appended claims.

In the drawing forming a part of this application, and in which like designating characters refer to corresponding parts throughout the several views;

Fig. 1 is a side elevational view of the present device, with the shiftable member thereof in a set or cocked position;

Fig. 2 is a similar view showing the shiftable member in its retracted, inoperative position, immediately after the same was released from its engagement with the stationary members of the device and immediately after said shiftable member has imparted a jerk to the fish line; and Fig. 3 is an edge elevational view of the present device with the shiftable member thereof in a cocked position, the view having been taken on the plane indicated by line 3—3 of Fig. 1.

Referring in detail to the present drawing there is shown therein base 10, which is of an oblong formation, and arcuate on a transverse cross section, whereby the same may overlie in a close contact the periphery of the handle 11′ of fish pole 11.

Annular clamp 12 engageable by means of thumb screw 13 with pole handle 11, positioned in an encompassing relation with the pole handle and said base 10 maintains the latter in a rigid relation with the pole handle 11′.

Rigidly formed with said base 10, and extending therefrom in an upward direction, adjacent the end of said base 10 which is farther removed from the free termination of the pole handle, is a stationary member, generally indicated by 14. Said stationary member 14 includes a transverse wall 15 and a pair of side walls 16, whereby said stationary member 14 is of a substantially U-shaped formation on transverse cross section, open in the direction of the free termination of the pole handle.

Adjacent the upper end of said transverse wall 15 the same is provided with a bifurcated hinge member 17 for receiving therewithin the looped end of arm 18. Extended through said hinge member 17 and the looped end of said arm 18 is pin 19. Extending from the hinge loop of said arm 18 is a short extension 20, which overlies the adjacent face of said arm 18. Said extension 20 terminates in hook 21. By virtue of this arrangement said arm 18, as well as extension 20 and hook 21, are adapted for selective swinging motions to a raised operative position shown in Fig. 1, or to a lowered inoperative position illustrated in Fig. 2.

Adjacent its free end said arm is provided with aperture 22, through which fish line 23 is passed.

Cooperating with said stationary member 14 is a shiftable member 24, which includes a transverse wall 25, from the upper end of which free extension 26 projects. Said extension 26 is provided with aperture 27 through which fish line 23 passes. A pair of side walls 28, integrally formed with said transverse wall 25 extends in the direction of the free termination of the pole handle 11′.

Integrally formed with said side walls 28, and projecting from the ends thereof which are nearest to said base 10 when the device remains in an operative set position, shown in Fig. 1, are lugs 29.

Extending from the opposite ends of said side walls 28 are enlarged plates 30, for accommodating therewithin spool 31, which is journalled upon pin 32 passed through said plates 30. Ears 33 extend from said plates 30. Pin 34 is mounted between said ears 33 and is rigidly supported therebetween. A rigidly formed hook 35 extends from said pin 34.

Pivot pin 36 passed through side walls 16 and 28, oppositely of said lugs 29, constitutes a pivot upon which said shiftable member 24 is capable of angular shifting movement with relation of said stationary member 14. When said shiftable member 24 is in an operative cocked position the same is received within the channel defined by walls 15 and 16 of said stationary member 14, as is seen in Fig. 1. When said shiftable member 24 is in a retracted position, shown in Fig. 2, the same assumes a substantially right-angled position with relation to said stationary member 14, with said lugs 29 in a contactual engagement with the inner face of wall 15, whereby the further shifting movement of said shiftable member 24 is prevented.

Mounted upon said wall 25 and extending from the rear face thereof is a pair of hinge members 37, between which looped end of hook 38 is disposed. Pin 39 passing through said hinge members 37 and the looped end of said hook 38, supports the latter in a loose, shiftable relation with said pin 39.

When said shiftable member 24 is brought to its operative, cocked position, said hinge members 37 and hook 38 remain above the upper end of said stationary member 14, as is seen in Fig. 1.

Pressed out from said base 20, or otherwise mounted thereon is bracket 40, with which the lower end of coil spring 41 is engaged. Said bracket 40 is in an alinement with the channel defined by said stationary member 14. The opposite end of said coil spring 41 is engaged with hooked pin 42 extending from and mounted upon wall 15 of said shiftable member 24, adjacent the upper end thereof, and disposed below said spool 31. Said coil spring 41 is under tension for urging said shiftable member 24 to its inoperative retracted position illustrated in Fig. 2. In that inoperative, retracted position said shiftable member 24 remains in a substantially parallel relation with said base 10, with lugs 29 in contact with wall 15 for limiting farther shifting movement of said shiftable member 24, as was hereinabove stated.

To condition said shiftable member 24 to its operative, cocked position, the same is manually shifted in an upward direction, and against the action of coil spring 41, until the major lower portion of said shiftable member 24 is brought within the channel defined by said stationary member 14. When in that position hook 38 will be brought rearwardly of the plane of wall 15 of said stationary member 14, to be engaged by hook 21, when arm 18 is manually angularly shifted in an upright direction to assume the position shown in Fig. 1. When said hooks 38 and 21 are interengaged said shiftable member 24 will continue to remain in its operative, cocked position, illustrated in Fig. 1, until said arm 18 is deflected in the direction away from said shiftable member 24 to disengage hook 21 from its engagement from hook 38.

To condition the device for imparting a jerking action to the fish line by the fish nibbling at the hook at the far end of the fish line, sufficient length of the line is unwound from spool 31, and thereupon the line is entwined several times around the stem of hook 35, in order to thereby firmly tie the line at that point with said hook 35.

The portion of the fish line between the point of its engagement with hook 35 to the point at which ball stop 43 connects therewith should not be taut but should be somewhat slack, so that when a fish pulls upon the line that portion of the line intermediately of hook 35 and the upper end of arm 18 may give sufficient play in order that ball stop 43 may be caused to bear against the adjacent face of said arm 18 and angularly shift the same upon pivot 19 and away from said shiftable member 24 for the purpose of disengaging hooks 21 and 38. Once said hooks are out of engagement spring 41 gives a pull to said shiftable member 24 imparting to it a sudden angular shifting movement to its inoperative, retracted position shown in Fig. 2. The sudden shifting action of said shiftable member 24 to its inoperative position imparts a sudden jerk to fish line 23, thereby effectively hooking the fish which theretofore was nibbling at the fish hook. Said shiftable member 24 while shifting to its inoperative, retracted position not only gives a sudden jerk to the fish line, but also gives to it a pull for further assuring an effective hooking of the fish.

It is further noted that the rear walls of the stationary member 14 and shiftable member 24 are concaved. This for the purpose of reducing the tensioning action of coil spring 41 upon shiftable member 24 at the inception of the operation of the device, for facilitating the triggering action of arm 18 when the same is actuated by stop 43, and thereby for facilitating the disengagement of hooks 21 and 38. When said arm 18 is triggered and hooks 21 and 38 are released from their interlocked position, spring 41 gradually acts upon said shiftable member 24 until said shiftable member 24 is slightly deflected from said stationary member 14, at which time spring 41 exerts full power to bring said shiftable member 24 to its retracted inoperative position for imparting thereby a sudden jerk to the fish line.

While there are described herein preferred embodiments of the present invention, it is nevertheless to be understood that minor changes may be made therein without departing from the spirit and scope of the invention as claimed.

What I claim as new is:

1. A device of the class described including a fish line and a stop carried thereby comprising a base, a stationary member rigidly supported upon said base, a shiftable member, a pivot connecting one end of said shiftable member with said stationary member, said shiftable member being adapted to shift upon said pivot for selectively assuming a contactual operative position with relation to said stationary member or an angular inoperative position with relation thereto, tensioning means for normally urging said shiftable member to its inoperative position, the fish line being adapted to be tied fast to said shiftable member, a hook carried by said shiftable member, an arm in a pivotal relation with said stationary member, and a hook carried by said arm, said arm being adapted to angularly shift upon said pivot for selectively assuming an operative position coextensive with said stationary member or an inoperative position substantially parallel with said stationary member, when said arm remains in its operative position the two hooks being capable of interengagement for maintaining said shiftable member in its operative position against the action of said tensioning means, when a pull is imparted to the fish line said stop being capable to bear against said arm for disengaging said hooks and thereby for permitting said shiftable member to shift to its inoperative position for imparting a jerk to the fish line.

2. A device of the class described including a fish line and a stop carried thereby, comprising a base, a stationary member, one end of said stationary member being rigidly connected with said base for supporting said stationary member substantially in a perpendicular relation with said base, a shiftable member, a pivot connecting one end of said shiftable member with said stationary member, said shiftable member being adapted to shift upon said pivot for selectively assuming a contactual operative position with relation to said stationary member or an angular inoperative position in parallelism with said base, a coil spring, one end of said coil spring being anchored to said base, the opposite end of said coil spring being connected with the opposite end of said shiftable member, said coil spring normally urging said shiftable member to its inoperative position, the fish line being adapted to be tied fast to said opposite end of said shiftable member, and disengageable means for interlocking said members while said shiftable member remains in its operative position, said means being actuable by said stop when a pull is exerted upon the fish line for rendering said means inoperaitve for causing said shiftable member to assume an inoperative position due to the action thereon of said coil spring for thereby imparting a jerk to the fish line.

3. A device of the class described including a fish line, comprising a base, a stationary member, one end of said stationary member being rigidly connected with said base for supporting said stationary member substantially in a perpendicular relation with said base, a shiftable member, a pivot connecting one end of said shiftable member with said stationary member, said shiftable member being adapted to shift upon said pivot for selectively assuming a contactual operative position with relation to said stationary member or an angular inoperative position in parallelism with said base, tensioning means for normally urging said shiftable member to its inoperative position, the fish line being adapted to be tied fast to said shiftable member, and means for interlocking said members while said shiftable member remains in an operative position, said last named means being actuable by the pull exerted upon the fish line for rendering said last named means inoperative for causing said shiftable member to assume an inoperative position due to the action of said tensioning means for thereby imparting a jerk to the fish line.

4. A device of the class described including a fish line, comprising a base, a stationary member, one end of said stationary member being rigidly connected with said base for supporting said stationary member substantially in a perpendicular relation with said base, a shiftable member, a pivot connecting one end of said shiftable member with said stationary member, said shiftable member being adapted to shift upon said pivot for selectively assuming a contactual operative position with relation to said stationary member or an angular inoperative position in parallelism with said base, tensioning means for normally urging said shiftable member to its inoperative position, the fish line being adapted to be tied fast to said shiftable member, means for interlocking said members while said shiftable member remains in an operative position, said last named means being actuable by the pull exerted upon the fish line for rendering said last named means inoperative for causing said shiftable member to assume an inoperative position due to the action of said tensioning means for thereby imparting a jerk to the fish line, and means for preventing said shiftable member from shifting beyond the parallel position with relation to said base when said shiftable member has shifted to its inoperative position.

5. A device of the class described including a fish line, comprising a base, a stationary member, one end of said stationary member being rigidly connected with said base for supporting said stationary member substantially in a perpendicular relation with said base, a shiftable member, a pivot connecting one end of said shiftable member with said stationary member, said shiftable member being adapted to shift upon said pivot for selectively assuming a contactual operative position with relation to said stationary member or an angular inoperative position in parallelism with said base, tensioning means for normally urging said shiftable member to its inoperative position, the fish line being adapted to be tied fast to said shiftable member, means for interlocking said members while said shiftable member remains in an operative position, said last named means being actuable by the pull exerted upon the fish line for rendering said last named means inoperative for causing said shiftable member to assume an inoperative position due to the action of said tensioning means for thereby imparting a jerk to the fish line, and a lug formed at the end of said shiftable member adjacent said pivot, said lug being adapted to come in contact with said stationary member when said shiftable member has assumed its inoperative position for preventing said shiftable member to shift beyond the parallel plane with relation to said base.

References Cited in the file of this patent

UNITED STATES PATENTS

| | | |
|---|---|---|
| 202,818 | Hesse | Apr. 23, 1878 |
| 1,475,408 | Reed | Nov. 27, 1923 |
| 2,295,250 | Zenewich | Sept. 8, 1942 |